United States Patent [19]
Donham

[11] 3,873,452
[45] Mar. 25, 1975

[54] ACIDIZING OIL WELLS

[75] Inventor: James E. Donham, Houston, Okla.

[73] Assignee: Amoco Production Company, Tulsa, Okla.

[22] Filed: Dec. 4, 1972

[21] Appl. No.: 309,840

Related U.S. Application Data

[63] Continuation-in-part of Ser. No. 95,905, Dec. 7, 1970, abandoned.

[52] U.S. Cl............ 252/8.55 C, 166/307, 252/341, 252/342, 260/76
[51] Int. Cl......................... C09k 3/00, E21b 21/04
[58] Field of Search.............. 252/8.55 C, 341, 342; 166/307; 260/76

[56] References Cited
UNITED STATES PATENTS

| | | | |
|---|---|---|---|
| 2,281,419 | 4/1942 | DeGroote et al.................. | 252/8.55 |
| 2,562,878 | 8/1951 | Blair .................................. | 252/342 |
| 2,925,429 | 2/1960 | Kirkpatrick et al................. | 252/342 |
| 2,950,313 | 8/1960 | Kirkpatrick......................... | 252/342 |
| 3,046,252 | 7/1962 | Stephens............................. | 260/77 |
| 3,110,682 | 11/1961 | DeGroote........................... | 252/342 |
| 3,205,169 | 9/1965 | Kirkpatrick et al................ | 252/8.55 |
| 3,387,059 | 6/1968 | Pajot................................... | 260/76 |
| 3,483,151 | 12/1969 | Biarnais et al...................... | 260/76 |

*Primary Examiner*—Benjamin R. Padgett
*Assistant Examiner*—B. Hunt
*Attorney, Agent, or Firm*—Arthur McIlroy; Paul F. Hawley

[57] ABSTRACT

When oil wells are acidized, troublesome emulsions frequently form. Such emulsions are prevented by adding to the acid a polyester and a quaternary ammonium compound. The quaternary ammonium compound is a dimethyl or dihydroxyethyl compound. The polyester is the reaction product of trimellitic acid, a polyalkylene glycol, a dicarboxylic acid, and a detergent-forming acid. The polyester and quaternary ammonium compound are preferably used as a solution in water and a water-soluble alcohol, although they can be hydrocarbon-based. The combination can be used in aqueous and non-aqueous well-stimulating liquids other than acids.

14 Claims, No Drawings

ACIDIZING OIL WELLS

When oil-producing formations are treated with aqueous solutions, such as solutions of hydrochloric acid, to stimulate flow of oil wells penetrating the formation, these aqueous solutions often form rather stable emulsions with the petroleum in the formation. An object of this invention is to provide a means for decreasing this emulsion-forming tendency. Still other objects will be apparent from the following description and claims.

I have found that a polyester based on trimellitic acid can be combined with a quaternary ammonium compound to prevent emulsion formation between aqueous acid solutions and many crude petroleum oils. The three carboxylic acid groups of the trimetllitic acid permit a type of cross-linking in the polyester which is not available with polyesters using dibasic acids. It has been also found, however, that the trimellitic acid polyester should be modified by a dicarboxylic acid and a fatty acid to provide the desired emulsion-preventing action.

A preferred polyester can be prepared by the following series of reactions. First, trimellitic anhydride is reacted with polyethylene glycol having a molecular weight of about 600. The ratio is about 3 moles of trimellitic anhydride to 8 moles of polyethylene glycol. This first reaction product is then reacted with about 2 moles of adipic acid to form a modified water-soluble polyester. The modified polyester is then reacted with about 1 mole of a carboxylic acid having a long hydrocarbon radical at a temperature from about 375° to about 450°F until about 1 mole of water has been distilled off. An example of such an acid is a tall oil fatty acid. This adjusts the oil solubility and thus the surface activity of the polyester. Acids suitable for this final step are, in general, the detergent-forming acids.

The polyesters of this type employed in my invention can be prepared in accordance with the procedure illustrated by the following specific example.

EXAMPLE

The reaction vessel is first purged dry with nitrogen and then charged with 8 moles (4800 grams) of polyethylene glycol having a molecular weight of 600. To this is added with stirring and heating 3 moles (577 grams) of trimellitic anhydride (TMA). The temperature of this mixture is increased gradually to about 350°F and water of reaction removed. This operation is continued until 6 moles (108 grams) of water — 1 mole for each acid group or 1/2 mole for each anhydride group — has been removed. At this point there is present 1 excess mole of polyethylene glycol to insure an esterification of all carboxyl groups on the TMA molecule. Thereafter, 2 moles (292 grams) of adipic acid is then added to this intermediate and heating continued. The temperature is increased to 375°F to 400°F and 3 to 4 moles of water distilled off. The resulting reaction product is a complex ester composed of 2 to 3, or more, of the ester formed in the first step, cross-linked with adipic acid. The molecular weight or degree of polymerization is determined by the reaction conditions, i.e., longer reaction time and higher temperature gives a higher degree of polymerization up to a practical limit, as denoted by a low acid number. From the initial esterification reaction up to production of the cross-linked product generally requires from 6 to 7 hours.

To the cross-linked ester referred to is added 1 mole (280 grams) of Arizona FA-1 tall oil fatty acid and heating continued until 1 mole of water is distilled off. This ordinarily requires from about 2 to 4 hours. The resulting product has an acid number usually in the range of from about 10 to 40. This is a good indication of the degree of polymerization that has occurred.

To the complex polyester prepared as described immediately above may be added the quaternary ammonium compound. There are two principal functions of this material. One is to coat finely-divide solids and prevent their acting as emulsifying agents. The other is to counteract the emulsifying tendencies of many of the anionic emulsifying agents naturally present in crude oils.

The mixture of polyester and quaternary ammonium compound is preferably dissolved in combination of isopropanol and water. The resulting solution can be easily dissolved in aqueous well-stimulating liquids.

Several alternates to some of the ingredients can be used. There can also be some variations in ratios of ingredients. None of these combinations has proved to be a universal emulsion preventer for all crude oils. Some of the preferred compositions, however, are effective with a surprisingly large number of crude oils. The optimum types of ingredients and ratios of ingredients vary with the nature of the crude oil. Certain limits, however, have been found to be important.

As a practical matter, trimellitic acid has no alternates. Some other tribasic acids, such as trimesic acid, are satisfactory to at least some degree but are not commercially available in amounts and at a price to be considered practical.

The main function of the dicarboxylic acid seems to be to limit the degree of cross-linking of the polyester by the trimellitic acid. This limits the molecular weight and modifies the polyester formed between the trimellitic acid and the polyalkylene glycol. Any of the ordinary low molecular-weight dicarboxylic acids previously proposed for forming polyester demulsifiers can be used. These include acids such as adipic, maleic, succinic, or even sebacic. They also include the hydroxy dicarboxylic acids, such as tartaric, and the like. Dibasic acids containing long alkyl radicals can also be used. These perform the dual function of modifying the structure of the polyester and also adjusting its oil solubility. Some very effective compositions have been prepared using as at least part of the dicarboxylic acid either or both of two specific acids of this type. One mixture of acids including principally the dimers of oleic, linoleic and linolenic acids. Another is the reaction product of polybutene and maleic anhydride. This second product is a substituted succinic acid containing the polybutene as an attached hydrocarbon radical. A particularly successful material is a mixture of such polybutene succinic acids in which the hydrocarbon radicals contain an average of about 20 carbon atoms. Still other dicarboxylic acids will occur to those skilled in the art. In general, the dicarboxylic acid should be one having at least about 4 but not more than about 50 carbon atoms in the molecule. This means that the molecular weight should be between about 115 and about 730.

The principal function of the polyalkylene glycol is to impart a hydrophilic nature to a portion of the polyester molecule. Part of this hydrophilic nature is due to the ester groups which form between the alcohol groups of the polyethylene glycol and the acid groups of the trimellitic and dibasic acids. Most of the hydrophilic nature, however, is due to the ether linkages present in the polyalkylene glycol. In preparing the polyalkylene glycol, propylene oxide, or even butylene oxide can be substituted for at least some of the ethylene oxide. The oxypropylene groups may be all blocked together at one location in the molecule, but preferably are distributed at random throughout the polyalkylene glycol molecule. Even pure polypropylene glycol can be used if the molecular weight is between about 1,000 and about 5,000. If substantially pure polyethylene glycol is used, the molecular weight should be in the range from about 200 to about 2,000, and preferably about 600. If the polyethylene glycol is a polymer of both ethylene oxide and propylene oxide, it will be apparent that the molecular weight can vary from about 200 if the polymer is almost entirely ethylene oxide to about 5,000 if the polymer is almost entirely propylene oxide.

Many alternates are available for the fatty acid. In general, the acids should have a long alkyl radical containing at least about 12 and not more than about 24 carbon atoms. Most of these acids are actually mixtures in which the 12 to 24 carbon atom limits are averages of hydrocarbon radical lengths. A wide variety of such acids is available. Some of the better lower cost acids include naphthenic acids, the petroleum oxidate acids and tall oil fatty acids. As previously noted, these are mostly the well known detergent-forming acids. Dimer and trimer acids, such as the polymerized linoleic and linolenic acids can also be used. As previously noted, the dibasic or dimer acids of this sort can be used not only to adjust oil solubility, but also to modify the structure and limit the molecular weight of the polyester. The polybutene succinic acids have also been found to be suitable for this final reaction which adjusts oil solubility.

Considering the ratios of ingredients of the polyester, the moles of trimellitic acid should usually be somewhat greater than the moles of dicarboxylic acid. The ratio should be in the range from about 1:1 to about 2:1 moles of trimellitic acid per mole of dibasic acid. Preferably, the ratio should be about 3:2.

The amount of polyalkylene glycol must be at least slightly more than enough to esterify all the carboxylic acid groups on the trimellitic and dicarboxylic acids. Preferably, about 1 unesterified hydroxyl group should remain for each molecule of trimellitic acid originally present. This number can range from about ⅓ to about 2, however. This means the moles of polyalkylene glycol should equal the moles of dicarboxylic acid plus from about 5/3 to about 2-½ times the moles of trimellitic acid. Preferably, the moles of polyalkylene glycol should equal the moles of dibasic acid plus 2 times the moles of trimellitic acids.

The moles of the final detergent acid should amount to from about ⅓ to about twice the moles of trimellitic acid and from about ⅓ to 1 times the free hysroxyl radicals remaining after reaction with the dibasic acid. Preferably, the amount of dibasic acid should be adjusted to leave about 1 unreacted hydroxyl for each molecule of trimellitic acid. From about ⅓ to ⅔ of these hydroxyls are then preferably esterified with the detergent-forming acid.

The quaternary ammonium compound may be either of 2 types. In one type, 2 of the 4 organic radicals should be methyl groups, while the other 2 are hydrocarbon radicals containing from about 12 to about 24 carbon atoms in each radical. In the other type, 2 of the organic radicals should be hydroxyethyl groups and at least 1 of the other 2 should be a hydrocarbon radical containing from about 12 to about 24 carbon atoms. The 4th organic radical in this second type is supplied by the methyl chloride, benzyl chloride, or the like, used to form the quaternary ammonium compound. Thus, this 4th group may contain from 1 to 25 carbon atoms. A preferred example of the first type is dimethyl dicoco ammonium chloride. A preferred example of the second type is dihydroxyethyl coco benzyl ammonium chloride.

It has been found that best results are usually obtained by using about twice as much of the quaternary ammonium compound as of the polyester. Thus, the ratio is preferably about 2:1. This ratio may vary, however, between about 1:1 and about 3:1.

Both the polyester and the quaternary ammonium compound are sufficiently water-soluble so they can be conveniently used in a water solution. Water solubility of the polyesters can be increased by the use of ammonia or an amine which forms a salt with the free acid group on the polymer chain. For field use, this aqueous solution should contain a water-soluble alcohol such as isopropanol to lower the pour point of the solution so it can be used in cold weather. The weight of alcohol should be from about 10 to about 30 percent of the weight of water.

The combined concentrations of the polyester and quaternary ammonium compound are conveniently from about 10 to about 30 percent in the alcohol-water solution. Preferably, the concentrations should total about 20 percent.

The preferred treating composition has the following composition:

| Ingredient | Percent by Weight |
|---|---|
| Polyester | 7 |
| Quaternary Ammonium Chloride | 13 |
| Isopropanol | 17 |
| Water | 63 |

In this composition, one of the preferred polyesters is prepared by reacting the following ingredients:

| Ingredient | Moles |
|---|---|
| Trimellitic Anhydride | 3 |
| Polyethylene Glycol (600 m.w.) | 8 |
| Adipic Acid | 2 |
| Tall Oil Fatty Acids | 2 |

The quaternary ammonium chloride is preferably dihydroxyethyl coco benzyl ammonium chloride.

The amount of aqueous treating solution used may vary from about ½ to about 20 gallons for each 1,000 gallons of acid or other aqueous stimulating liquid. The amount varies widely depending on the nature of the crude oil. Usually, the concentration should be in the range from about 1 to about 10 gallons per 1,000 gallons of acid. Since the combined concentrations of polyester and quaternary ammonium compounds is about 20 percent of the total treating composition, the combined concentrations of polyester and quaternary ammonium compound in the acid is from about 0.01 to about 0.4 percent, and preferably from about 0.01 to about 0.4 percent by volume of the acid.

In some cases, it may be desirable to use the combination of polyester and quaternary ammonium chloride in non-aqueous solvent. In this case, a solution in a liquid hydrocarbon can be formed by using a lower molecular weight alcohol, such as isopropanol, as a mutual solvent or coupling agent. Preferably, the liquid hydrocarbon is an aromatic solvent such as xylene. In this solution, the amount of alcohol should be from about 10 to about 30 percent of the concentration of aromatic solvent. An example of an application for such a composition is a paraffin solvent treatment of a formation which produces water as well as crude oil, or fracturing a water-bearing formation with a hydrocarbon fracturing fluid.

Many compositions were prepared and tests run to define the alternates, ratios and concentrations stated above. Results are presented below of emulsion prevention tests using a few of the better compositions. All these compositions contained 63 percent by weight water, 17 percent isopropanol, 13 percent dihydroxyethyl coco benzyl ammonium chloride, and 7 percent of one of the polyestes shown in Table I.

TABLE I

| COMPOSITION NUMBERS → | 1 | 2 | 3 | 4 | 5 |
|---|---|---|---|---|---|
| Ingredients | Moles Ingredients in Compositions | | | | |
| Trimellitic Anhydride | 3 | 3 | 3 | 3 | 3 |
| Polyethylene Glycol (600 m.w.) | 8 | 8 | 8 | 8 | 8 |
| Adipic Acid | 1 | 2 | 1 | | 1 |
| Polybutene Succinic Acid | 1 | | 1 | 2 | |
| 36 Carbon Atom Dimer Acid | | | 1 | | 1 |
| Tall Oil Fatty Acids | 1 | 2 | 1 | 3 | 1 |

The polybutene succinic acid was a mixture of acids having an average molecular weight of about 430. This gave an average polybutene radical length of about 20 carbon atoms. The dimer acid was a polymer of mixed 18 carbon-atom unsaturated acids. It was mostly dimer acids, but contained about 20 percent trimer and about 3 percent monomer acids.

In the emulsion-prevention tests, the composition to be tested was dissolved in 50 milliliters of 15 percent hydrochloric acid containing about 0.4 percent by volume of a commercial acid corrosion inhibitor. This acid solution was then stirred at high speed for 1 minute with 50 milliliters of crude oil from the formation to be treated. The resulting emulsion was then allowed to stand and the amount of separation of aqueous phase was recorded at various times. Some results of these tests for several crude oils are reported in Table II.

TABLE II

| Formation | Massig-Wilcox | | | | | | | | | | | | | | |
|---|---|---|---|---|---|---|---|---|---|---|---|---|---|---|---|
| Composition | C | C | C | 2 | 2 | 2 | 2 | 2 | 2 | 3 | 4 | 4 | 4 | 4 | 4 |
| Ml. Comp. | .05 | .10 | .15 | .05 | .05 | .10 | .10 | .15 | .20 | .10 | .05 | .10 | .10 | .15 | .20 |
| Time, Min. | Separation, Ml. | | | | | | | | | | | | | | |
| 1 | 6 | 10 | 4 | 4 | 25 | 5 | 13 | 4 | 5 | 10 | 3 | 2 | 4 | 3 | 3 |
| 2 | 6 | 10 | 10 | 9 | 30 | 10 | 38 | 8 | 7 | 10 | 5 | 4 | 18 | 4 | 5 |
| 4 | 6 | 10 | 17 | 17 | 34 | 20 | 41 | 14 | 15 | 10 | 9 | 9 | 36 | 10 | 10 |
| 6 | 6 | 10 | 29 | 30 | 35 | 30 | 42 | 20 | 22 | 10 | 15 | 13 | 36 | 15 | 15 |
| 8 | 6 | 10 | 35 | 45 | 35 | 45 | 43 | 26 | 30 | 10 | 18 | 18 | 39 | 20 | 20 |
| 10 | 20 | 20 | 43 | 48 | 36 | 48 | 43 | 31 | 39 | 15 | 24 | 24 | 40 | 25 | 25 |

| Formation | Slick-Wilcox | | | | | | Upper Clearfork | | | | | |
|---|---|---|---|---|---|---|---|---|---|---|---|---|
| Composition | C | 1 | 2 | 3 | 4 | 5 | C | 1 | 2 | 3 | 4 | 5 |
| Ml. Comp. | .10 | .10 | .10 | .10 | .10 | .10 | 1.0 | 1.0 | 1.0 | 1.0 | 1.0 | 1.0 |
| Time, Min. | Separation, Ml. | | | | | | | | | | | |
| 1 | 6 | 2 | 1 | 15 | 10 | 2 | 2 | 7 | 0 | 10 | 6 | 7 |
| 2 | 9 | 3 | 8 | 19 | 17 | 3 | 4 | 14 | 0 | 20 | 19 | 11 |
| 4 | 17 | 15 | 25 | 21 | 23 | 19 | 7 | 29 | 3 | 39 | 25 | 24 |
| 6 | 27 | 29 | 39 | 27 | 28 | 30 | 10 | 41 | 3 | 48 | 32 | 37 |
| 8 | 33 | 40 | 43 | 35 | 37 | 36 | 14 | 48 | 4 | 48 | 38 | 47 |
| 10 | 34 | 43 | 44 | 39 | 40 | 42 | 19 | 49 | 5 | 48 | 39 | 49 |

| Formation | San Andres | | | | | | | Devonian | | | | |
|---|---|---|---|---|---|---|---|---|---|---|---|---|
| Composition | C | C | 1 | 2 | 3 | 4 | 5 | C | 1 | 2 | 3 | 5 |
| Ml. Comp. | .8 | 1.0 | 1.0 | 1.0 | 1.0 | 1.0 | 0.8 | 1.0 | 1.0 | 1.0 | 1.0 | 1.0 |
| Time, Min. | Separation, Ml. | | | | | | | | | | | |
| 1 | 2 | 3 | 5 | 0 | 7 | 20 | 3 | 8 | 0 | 0 | 0 | 0 |
| 2 | 4 | 5 | 10 | 10 | 17 | 40 | 6 | 24 | 0 | 2 | 1 | 0 |
| 4 | 9 | 9 | 20 | 31 | 34 | 47 | 11 | 30 | 4 | 6 | 4 | 4 |
| 6 | 13 | 13 | 31 | 49 | 46 | 47 | 16 | 32 | 6 | 8 | 7 | 10 |
| 8 | 17 | 18 | 41 | 49 | 48 | 48 | 22 | 33 | 8 | 9 | 9 | 14 |
| 10 | 22 | 23 | 48 | 49 | 49 | 48 | 29 | 35 | 8 | 10 | 11 | 20 |

In the table, composition "C" is a commercially available emulsion preventer which has been included for comparison. Other compositions contain the polyesters shown in Table I, together with the other ingredients previously described. Some duplicate tests have been included to show that the test sometimes gives rather erratic results, particularly at low concentrations and with compositions on the borderline of effectiveness.

In use, the solution of the emulsion-preventing compositions may precede or follow the acid. It may also be pumped into the top of the well simultaneously with the acid so mixing can take place on the way down the well. Preferably, however, the emulsion-preventing composition is mixed into the acid or other stimulating solution before this solution is pumped down the well. After treatment, the well is easily returned to full oil production because of the decreased emulsion in the formation. Other steps of the process are those conventionally used in well-acidizing operations.

While the preferred acid employed in combination with the polyesters herein described is hydrochloric acid, any of the other acids such as, for example, hydrofluoric acid, acetic acid, mono- and di-chloro acetic acids, and the like, that have previously been used in oil well acidizing operations may be employed.

The reactants employed in preparing the above-described polyesters are generally unsubstituted compounds. However, other functional groups may be present so long as the properties of the reactants remain characteristic of those of carboxylic acids and glycols.

Several alternates and variations in compositions and methods have been described above. Still others will be apparent to those skilled in the art. Therefore, I do not wish to be limited to the example described, but only by the following claims.

I claim:

1. In a method of acidizing an oil-producing formation penetrated by a well in which method an aqueous solution of an acid is injected down said well and into said formation, the improvement comprising
   employing as the acidizing agent an aqueous acid solution containing a polyester and a quaternary ammonium compound,
   the weight of quaternary ammonium compound being from about 1 to 3 times the weight of polyester,
   the combined concentrations of polyester and quaternary amonium compound being from about 1 to about 0.4 percent by volume of said aqueous acid solution,
   said quaternary ammonium compound being selected from the group consisting of dimethyl dicoco ammonium chloride and dihydroxyethyl coco benzyl ammonium chloride,
   said polyester being the reaction product of trimellitic acid, a polyalkylene glycol, a dicarboxylic acid having a molecular weight between about 115 and about 730 and a detergent-forming monocarboxylic acid having a hydrocarbon radical containing from about 12 to about 24 carbon atoms in the radical,
   the ratio of moles of trimellitic acid to dicarboxylic acid being from about 1:1 to about 2:1,
   the moles of the polyalkylene glycol being equal to the moles of dicarboxylic acid plus from about 5/3 to about 2-½ times the moles of trimellitic acid,
   the moles of detergent-forming acid being sufficient to react with from about ⅓ to all the free hydroxyl radicals remaining after reaction of the polyalkylene glycol with the trimellitic and dicarboxylic acids,
   said polyalkylene glycol being selected from the group consisting of polyethylene glycol having a molecula weight from about 200 to about 2,000, polypropylene glycol having a molecular weight from about 1,000 to about 5,000 and polymers of both ethylene oxide and propylene oxide having a molecular weight from about 200 to about 5,000.

2. The method of claim 1 in which said polyalkylene glycol is polyethylene glycol having a molecular weight of about 600, said dicarboxylic acid is adipic acid, said detergent-forming acid is a mixture of tall oil fatty acids and said quaternary ammonium compound is dihydroxyethyl coco benzyl ammonium chloride.

3. The method of claim 1 in which the molar ratio of trimellitic acid to polyalkylene glycol to dibasic acid is about 3:8:2.

4. The method of claim 1 in which said polyester and said quaternary ammonium compound are added to said acid solution as a treating solution in a mixture of water and water-soluble alcohol, the combined concentrations of polyester and qaternary ammonium compound in said treating solution being from about 10 to about 30 percent by weight, and the weight of water-soluble alcohol being from about 10 to about 30 percent of the weight of water.

5. The method of claim 4 in which the treating solution added to said acid solution has approximately the following composition:

| Ingredient | Percent by Weight |
|---|---|
| Polyester | 7 |
| Quaternary Ammonium Compound | 13 |
| Isopropanol | 17 |
| Water | 63 | the concentration of said treating solution in said acid solution being from about 1 to about 10 gallons in each 1,000 gallons of acid.

6. The method of claim 1 in which said polyester and said quaternary ammonium compound are added to said acid solution as a treating solution in a mixture of a liquid hydrocarbon and a water-soluble alcohol, the combined concentrations of polyester and quaternary ammonium compound in said treating solution being from about 10 to about 30 percent by weight, and the weight of water-soluble alcohol being from about 10 to about 30 percent of the weight of the hydrocarbon liquid.

7. The method of claim 6 in which the treating solution added to said acid solution has approximately the following composition:

| Ingredient | Percent by Weight |
|---|---|
| Polyester | 7 |
| Quaternary Ammonium Compound | 13 |
| Isopropanol | 20 |
| Xylene | 60 | the concentration of said treating solution in said acid solution being from about 1 to about 10 gallons in each 1,000 gallons of acid.

8. An emulsion-preventing composition suitable for addition to an aqueous stimulating liquid, such as acidizing solution, for use in an oil well, said composition consisting essentially of a polyester and a quaternary ammonium compound, the weight of quaternary ammonium compound being from about 1 to about 3 times the weight of polyester, said quaternary ammonium compound being selected from the group consisting of dimethyl dicoco ammonium chloride and dihydroxyethyl coco benzyl ammonium chloride, said polyester being the reaction product of trimellitic acid, a polyalkylene glycol, a dicarboxylic acid having a molecular between about 115 and about 730, and a detergent-forming monocarboxy,ic acid having a hydrocarbon radical containing from about 12 to about 24 carbon atoms in the radical, the ratio of moles of trimellitic acid to dicarboxylic acid being from about 1:1 to about 2:1, the moles of polyalkylene glycol being equal to the moles of dicarboxylic acid plus from about 5/3 to about 2½-times the moles of trimellitic acid, the moles of detergent-forming acid being sufficient to react with from about ⅓ to all the free hydroxyl radicals remaining after reaction of the polyalkylene glycol with the trimellitic and dicarboxylic acids, said polyalkylene glycol being selected from the group consisting of polyethylene glycol having a molecuclar weight from about 200 to about 2,000, polypropylene glycol having a molecular weight from about 200 to about 2,000, polypropylene glycol having a molecular weight from about 1,000 to about 5,000 and polymers of both ethylene oxide and propylene oxide having a molecular weight from about 200 to about 5,000.

9. The composition of claim 8 in which said polyalkylene glycol is polyethylene glycol having a molecular weight of about 600, said dicarboxylic acid is adipic acid, said detergent-forming acid is a mixture of tall oil fatty acids, said quaternary ammonium compound is dihydroxyethyl coco benzyl ammonium chloride and said acidizing solution consisting essentially of aqueous hydrochloric acid.

10. The composition of claim 8 in which the molar ratio of trimellitic acid to polyalkylene glycol to dibasic acid is about 3:8:2.

11. The composition of claim 8 in which said composition also contains water and a water-soluble alcohol to form an aqueous treateing solution, the combined concentratons of polyester and quaternary ammonium compound in said treating solution being from about 10 to about 30 percent by weight, and the weight of water-soluble alcohol being from about 10 to about 30 percent of the weight of water.

12. The composition of claim 11 in which the treating solution has approximately the following composition:

| Ingredient | Percent by Weight |
|---|---|
| Polyester | 7 |
| Quaternary Ammonium Compound | 13 |
| Isopropanol | 17 |
| Water | 63 |

13. The composition of claim 8 in which said composition also contains a liquid hydrocarbona and a water-soluble alcohol to form a non-aqueous treating solution, the combined concentrations of polyester and quaternary ammonium compound in said treating solution being from about 10 to about 30 percent by weight, and the weight of water-soluble alcohol being from about 10 to about 30 percent of the weight of liquid hydrocarbon.

14. The composition of claim 13 in which the treating solution has approximately the following composition:

| Ingredient | Percent by Weight |
|---|---|
| Polyester | 7 |
| Quaternary Ammonium Compound | 13 |
| Isopropanol | 20 |
| Xylene | 60 |

* * * * *

UNITED STATES PATENT OFFICE
CERTIFICATE OF CORRECTION

PATENT NO. : 3,873,452
DATED : March 25, 1975
INVENTOR(S) : James E. Donham

It is certified that error appears in the above-identified patent and that said Letters Patent are hereby corrected as shown below:

Column 1, line 4, after "oil" and before "wells", insert --to--.

Column 3, line 55, after "plus" and before "2", insert --about--;
line 59, "hysroxyl" should read --hydroxyl--.

Column 4, line 10, "1 to 25" should read --1 to 24--.

Column 5, lines 3 and 4, should read as follows: --
--about 0.4 percent, and preferably from about 0.02 to about 0.2 percent by volume of the acid.--;
line 26, "polyestes" should read --polyesters--.

Column 7, line 50, "1" should read --0.01--.

Column 8, line 8, "molecula" should read --molecular--.

Column 9, line 18, after "molecular" insert --weight--;
line 19, "monocarboxy;ic" should read --monocarboxylic--;
lines 36 and 37, delete [from about 200 to about 2,000, polypropylene glycol having a molecular weight].

Column 10, line 8, "treateing" should read --treating--;
line 26, "hydrocarbona" should read --hydrocarbon--.

Signed and Sealed this

Seventh Day of September 1976

[SEAL]

Attest:

RUTH C. MASON
Attesting Officer

C. MARSHALL DANN
Commissioner of Patents and Trademarks